No. 681,699. Patented Sept. 3, 1901.
E. HEWSON.
CORSET FASTENER.
(Application filed Mar. 5, 1901.)

(No Model.)

Witnesses
Bernard M. Offutt
A. S. Carell

Inventor
Elizabeth Hewson,
by David P. Moore,
Attorney

THE NORRIS PETERS CO., PHOTO-LITHO., WASHINGTON, D. C.

ptember 3, 1901.
UNITED STATES PATENT OFFICE.

ELIZABETH HEWSON, OF NEWARK, NEW JERSEY.

CORSET-FASTENER.

SPECIFICATION forming part of Letters Patent No. 681,699, dated September 3, 1901.

Application filed March 5, 1901. Serial No. 49,814. (No model.)

*To all whom it may concern:*

Be it known that I, ELIZABETH HEWSON, a citizen of the United States, and a resident of Newark, in the county of Essex and State of New Jersey, have invented a new and useful Improvement in Corset-Fasteners, of which the following is a specification.

My invention relates to improvements in corset-fasteners; and the main object of my invention is the provision of a corset-fastener which is easily and quickly fastened or unfastened when necessary, but which will not accidentally become unfastened.

Another object of my invention is the provision of a simple, durable, and inexpensive corset-fastener which is very efficient and practical in use.

To attain the desired objects, the invention consists of a corset-fastener embodying novel features of construction and combination of parts, substantially as disclosed herein.

Figure 1:
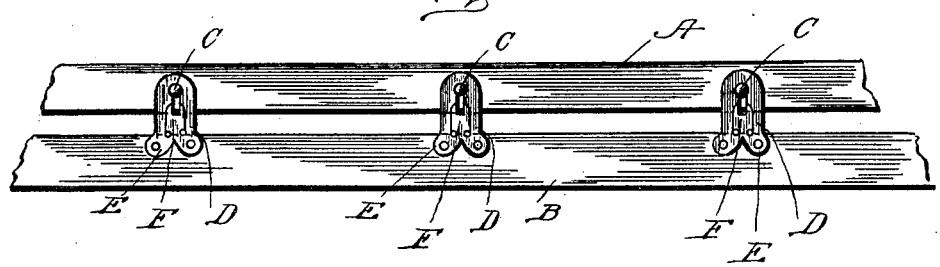
Figure 2:
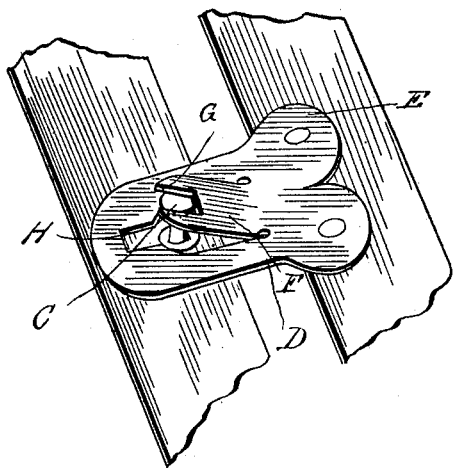

In the drawings, Figure 1 is a top plan view of a portion of two corset-steels with my fastener in use. Fig. 2 is a perspective view of the fastener, on an enlarged scale, in the position it assumes when fastening the same, and Fig. 3 is a similar view when unfastening.

Referring to the drawings, A and B designate the corset-steels, one of which is provided with the headed pins or studs C, while the other has secured at proper intervals the eyelets D. These eyelets each consist of the plate provided with the lobes or ears E, having means to secure the plate to a steel, and has cut from the body portion thereof the spring-flap or guard-plate F, which is substantially U-shaped and is provided with a recess or slot G, which registers with, when the flap or guard-plate is in line with the body of the eyelet, the rectangular recess or opening H of the plate or eyelet. The eyelets are made from spring metal, so that when the stud is pushed or pulled the spring-flap will allow the insertion or withdrawal of the stud and will return itself to its proper position. It will thus be seen that when the stud has its head projecting through the recess or opening H of the plate and also the slot G of the spring-flap it is impossible for the stud to slide so as to become disengaged from the eyelet; but when it is desired to release the stud from engagement it is simply necessary to push the stud's post into the spring-flap's recess and pull downward and the flap will spring downward and allow the stud to be withdrawn through the large opening or gap caused by the movement of the flap.

Figure 3:
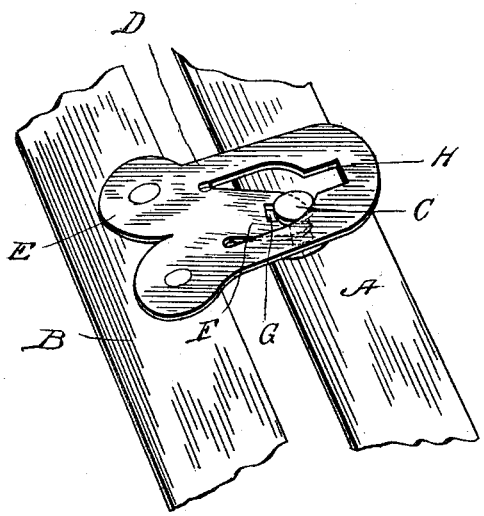

In Figs. 2 and 3 the operations of fastening and unfastening my corset-fastener are plainly illustrated, and I therefore deem it unnecessary to go further into the use; but I would here state that my main object is to produce an eyelet having a spring-flap which when the stud is in position prevents it from becoming accidentally unfastened, yet will allow the stud to be withdrawn very easily and quickly at pleasure.

It will be noticed that when the stud is in engaged position within the plate's opening it is not in contact or held by the flap, and when it is being placed in engagement or released therefrom it is out of contact with the plate's opening and is only in contact with the opening in the flap. This point is of vital importance, as by this construction it is impossible for the stud to become accidentally disengaged when the fastener is in use.

Thus it will be seen that I provide a corset-fastener which is the embodiment of simplicity, durability, and inexpensiveness, as well as useful and practical.

I claim—

A corset-fastener, consisting of a pair of steels, one carrying studs provided with heads and the other carrying eyelets; said eyelets each comprising a plate made of spring metal, a flap cut therefrom and having parallel sides, a rectangular recess or opening being cut from the outer edge of the flap, and a rectangular opening or recess being cut from the body of the plate opposite the opening of the flap so that when the flap is in the same plane as the plate the two openings form one continuous rectangular opening or slot, whereby when the stud is in engaged position within the opening of the plate it is not in contact or held by the flap and when it is being released or engaged it is out of contact with the opening in the plate and only in contact with the flap's opening.

In testimony whereof I affix my signature in the presence of two witnesses.

ELIZABETH HEWSON.

Witnesses:
 JOSEPH STRETCH,
 JOHN J. SLATTERY.